United States Patent [19]
Nelson et al.

[11] Patent Number: 5,957,406
[45] Date of Patent: Sep. 28, 1999

[54] BI-DIRECTIONAL CARGO RESTRAINT

[75] Inventors: Paul E. Nelson, Arlington; Arturo M. Escobar, Bothell; Jeffrey R. Nix, Stanwood, all of Wash.

[73] Assignee: The Boeing Company, Seattle, Wash.

[21] Appl. No.: 08/984,306

[22] Filed: Dec. 3, 1997

[51] Int. Cl.[6] .................................................. B64D 9/00
[52] U.S. Cl. ......................................... 244/118.1; 410/86
[58] Field of Search ........................... 244/118.1, 137.1, 244/137.3; 410/77–78, 69, 107, 111, 86

[56] References Cited

U.S. PATENT DOCUMENTS

| | | | |
|---|---|---|---|
| 3,759,476 | 9/1973 | Goodwin | 410/86 |
| 3,796,397 | 3/1974 | Alberti | 244/137.1 |
| 3,810,534 | 5/1974 | Prete, Jr. | 410/86 |
| 3,986,460 | 10/1976 | Voigt et al. | 244/137.1 |
| 4,175,656 | 11/1979 | Lang . | |
| 4,234,278 | 11/1980 | Harshman et al. | 244/118.1 |
| 4,388,030 | 6/1983 | Skaale . | |
| 4,395,172 | 7/1983 | Hoener et al. . | |
| 4,498,823 | 2/1985 | Trautman . | |
| 4,583,896 | 4/1986 | Vogg et al. | 410/69 |
| 4,875,645 | 10/1989 | Courter . | |
| 5,004,387 | 4/1991 | Jensen et al. . | |
| 5,011,348 | 4/1991 | Jensen et al. | 410/69 |

*Primary Examiner*—Galen L. Barefoot
*Attorney, Agent, or Firm*—Christensen O'Connor Johnson & Kindness PLLC

[57] ABSTRACT

A bi-directional cargo restraint (20) for restraining a cargo container (22) from movement across an interior surface of an aircraft. The cargo restraint having a frame (40) with an upper surface (60) positionable flush or below the surface of the aircraft, a first end (56), a second end (58), and an axis extending between the first and second ends. The cargo restraint also having a first stop member (42), a second stop member (44), and an abutment member (46) with a top portion (82) and a base portion (80). The top portion of the abutment member is movably mounted to the frame for movement of the abutment member between an extended position and a retracted position. The abutment member in the extended position capable of being toggled against either the first or second stop member. The first end of the abutment member having first and second restraining surfaces (84 and 86) on opposite sides of the first end. The abutment member in the extended position capable of being toggled between the first and second stop members to selectively permit either the first or second restraint surface of the abutment member to restrain the container at a predetermined restraint position.

12 Claims, 3 Drawing Sheets

BI-DIRECTIONAL CARGO RESTRAINT

FIELD OF THE INVENTION

The present invention relates generally to aircraft cargo restraint devices, and, in particular, to bi-directional cargo restraint devices.

BACKGROUND OF THE INVENTION

In modern cargo carrying aircraft, cargo may be loaded through a cargo door located in a side of the fuselage. Cargo is normally packaged either in specially designed containers or on pallets. Both are known as unit load devices (ULDs). Passenger luggage is typically stowed in a container, while bulk freight, such as dry goods, is usually stowed on pallets. Typically, containers measure 60.4 inches in length and pallets are either 88 or 96 inches long. The ULD is then transferred into the fuselage through the cargo door and is maneuvered within the fuselage on the cargo deck. The cargo deck typically has a plurality of omni-directional and directional transfer supports to ease the passage of ULDs over the deck and into a final stowed positioned where it is secured to the cargo deck by a number of either fixed or relocatable restraints.

Airline operators frequently transport a mixture of containers and pallets. Current loading procedures on certain wide body airplanes require repeated loading of containers without restraints placed between the containers, and is known in the art as gang or stack loading. Pallets are individually restrained (i.e., pallet locks are raised after loading each pallet). Individually restraining ULDs is more time consuming than gang loading. Ideally, pallets are loaded into the fuselage first, such that they are located furthest from the cargo door. Loading pallets first is desirable because containers typically contain passenger luggage and should be unloaded first to facilitate expedient transfer of the luggage to its final destination. After each pallet is loaded, pallet lock restraints, located adjacent the base of the pallet, are locked into an upright position and prevent the pallets from moving longitudinally within the fuselage. If the operator desires to load containers after the pallets have been loaded, an end stop could be placed in the cargo deck between the last pallet and first container or the last pallet lock may be used. Finally, after the last container has been loaded, another set of restraints is locked into position to prevent longitudinal movement within the fuselage during operation of the aircraft.

Cargo restraints currently available have several aspects that detract from their usefulness. Typical restraints available in the art restrain movement of the containers in only one direction, and therefore, both load and end stops are required when carrying a mixture of containers and pallets. Also, because the lengths of the containers and pallets are not multiples of each other, intermixing both containers and pallets require either a large number of fixed restraints or the restraints must be easily relocatable to accommodate the large number of potential container/pallet combinations. Additional restraints add more weight to the aircraft and, therefore, reduce the amount of revenue generating weight that the aircraft can carry. Relocatable restraints are required to be positioned within the cargo deck before the cargo hold is loaded to accommodate the planned mix of containers and pallets, thereby requiring additional time on the ground. In an industry where time is of the essence, any additional time required to ensure proper location of the restraint system is undesirable. Furthermore, if the restraints are relocatable, they may be lost, stolen or mislocated causing damage to the aircraft. Finally, if the relocatable restraints are retained in some type of track, the restraints eventually become difficult to slide along the track because of damage or a build up of debris.

Thus, there exists a need for a cargo restraint that reduces the chance of being lost or stolen, and that can be permanently located to readily accommodate an intermix of containers and pallets. The present invention addresses these and other issues in overcoming the limitations currently encountered in the art.

SUMMARY OF THE INVENTION

The present invention is a bi-directional cargo restraint mechanism for restraining a container from movement longitudinally within the interior surface of an aircraft. The restraint mechanism has a frame having an upper surface positionable flush or below the cargo transfer surface of the aircraft, first and second ends, and an axis extending between the first and second ends. The restraint mechanism also has first and second stop members mounted in the frame, and an abutment member having first and second ends. The second end of the abutment member is movably mounted to the frame for movement of the abutment member between an extended position and a retracted position. The abutment member in the extended position is capable of being toggled against either the first or second stop member. The first end of the abutment member selectively restrains the container at a predetermined restraint position to prevent the container from traversing the frame in the axial direction toward the first or second end of the frame, depending on whether the abutment member is toggled against the first or second stop member, respectively.

In the preferred embodiment, the restraint position is defined by a plane extending perpendicularly to the upper surface of the frame and orientated transversely to the axis. The first end of the abutment member has first and second restraining surfaces located on opposite sides thereof. The abutment member, in the extended position, is capable of being toggled between the first and second stop members to selectively permit either the first or second restraint surface of the abutment member to restrain the container at the predetermined restraint position.

In another aspect of the invention, the first stop member has a first end pivotally mounted in the frame at a predetermined distance from the first end of the frame and a second end longitudinally spaced therefrom. The first stop member is pivotal between a stop position for blocking engagement with the abutment member when the abutment member is in the extended position, thereby restraining the container against the second restraining surface at the restraint position, and a nested position, where the container freely traverses the restraint mechanism.

In yet another aspect of the present invention, the second stop member is rigidly secured to the frame at a predetermined distance from the second end of the frame. The second stop member is positioned for blocking engagement with the abutment member when the abutment member is in the extended position to restrain the container against the first restraining surface at the restraint position.

The bi-directional cargo restraint of the present invention provides several advantages over cargo restraints currently available in the art. The cargo restraint of the present invention provides an abutment member that may be toggled within a frame, such that opposite sides of the abutment member can restrain containers at a common, dedicated restraint position to prevent the container from traversing the frame along an axial direction defined between the ends of the frame. Having a dedicated restraint position capable of accommodating fore and aft loads reduces the number of restraints required in a cargo hold of an aircraft and, therefore, increases the amount of revenue generating payload an aircraft may carry. Rigidly securing the bi-directional cargo restraint of the present invention to the aircraft eliminates the need for airline operators to relocate the restraints and, therefore, not only saves time in loading and unloading the aircraft, but also reduces the risk of lost or stolen restraints. These and other advantages combine to define a bi-directional cargo restraint that can restrain cargo containers at a common, dedicated restraint position, such that the cargo restraint of the present invention may be used both as an end stop and a load stop without requiring airline operators to relocate restraints. The present invention allows the airline operators to gang load containers, have dedicated restraint positions and intermix containers and pallets in any combination which is not available with cargo restraints currently available in the art.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
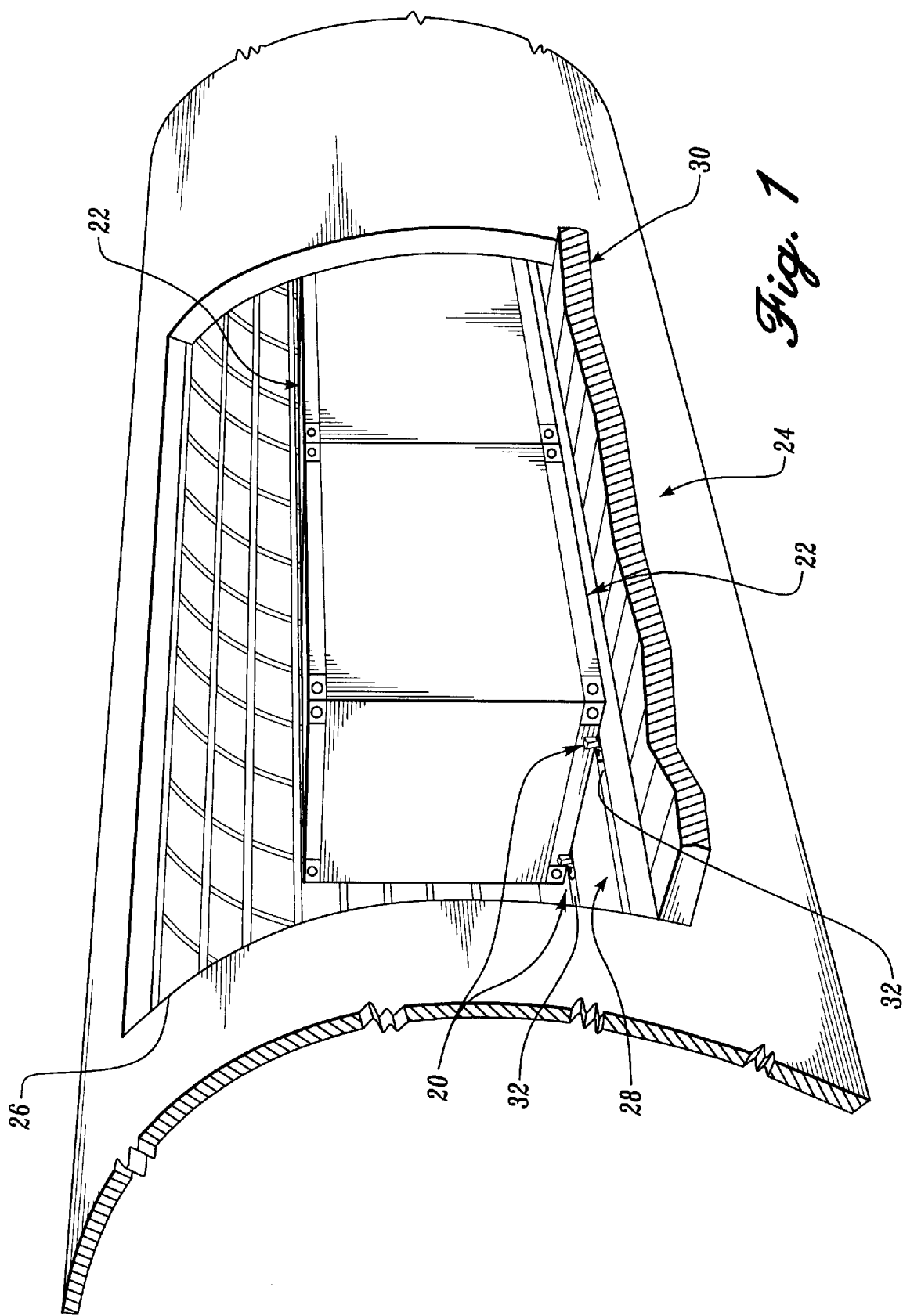
FIG. 1 is an environmental view of a bi-directional cargo restraint of the present invention shown in the cargo deck of an aircraft as it would be used to restrain cargo containers.

FIG. 1 illustrates a preferred embodiment of a pair of bi-directional cargo restraints 20, shown in an extended position to restrain a plurality of cargo containers 22 within a fuselage 24 of an aircraft (not shown). The aircraft includes a cargo door opening 26 located in the side of the fuselage 24 and a cargo floor 28. The containers 22 are loaded into the fuselage 24 by passing over a cargo ramp 30 (partially shown) located adjacent the base of the door opening 26. After passing through the door opening 26, the containers 22 are maneuvered within the fuselage 24 to a final stowage position by passing over the cargo transfer system (not shown) located in the cargo floor 28. The containers 22 are loaded one after the other such that the containers 22 align along a longitudinal axis extending between the nose (not shown) and tail (not shown) of the airplane. Also, depending upon the width of the fuselage 24, the containers 22 may be loaded two abreast (not shown) within the fuselage 24. After the last container 22 has been loaded, the cargo restraints 20 are pivotable from a retracted position to an extended position to restrain the containers 22 from moving within the fuselage 24, as is described in greater detail below.

The cargo restraints 20 are rigidly secured to the aircraft by well known fasteners, such as rivets or nuts and bolts or cargo track tension studs and shear studs, and are positioned in cargo tracks 32 located in the cargo floor 28, as is described in greater detail below. The cargo tracks 32 extend the length of the cargo floor 28 and a plurality of cargo restraints 20 may be located at predefined intervals to accommodate a variety of possible combinations of loading containers 22 of varying lengths. Although the cargo restraints 20 of the present invention are illustrated as restraining box-like containers 22, the cargo restraints 20 may also be used to restrain other platforms of unitizing cargo, such as pallets. Furthermore, although it is preferred that the cargo restraints 20 be located in the cargo floor of the aircraft, other locations of the restraints, such as trays or aircraft structure, are also within the scope of the invention.

Figure 2:
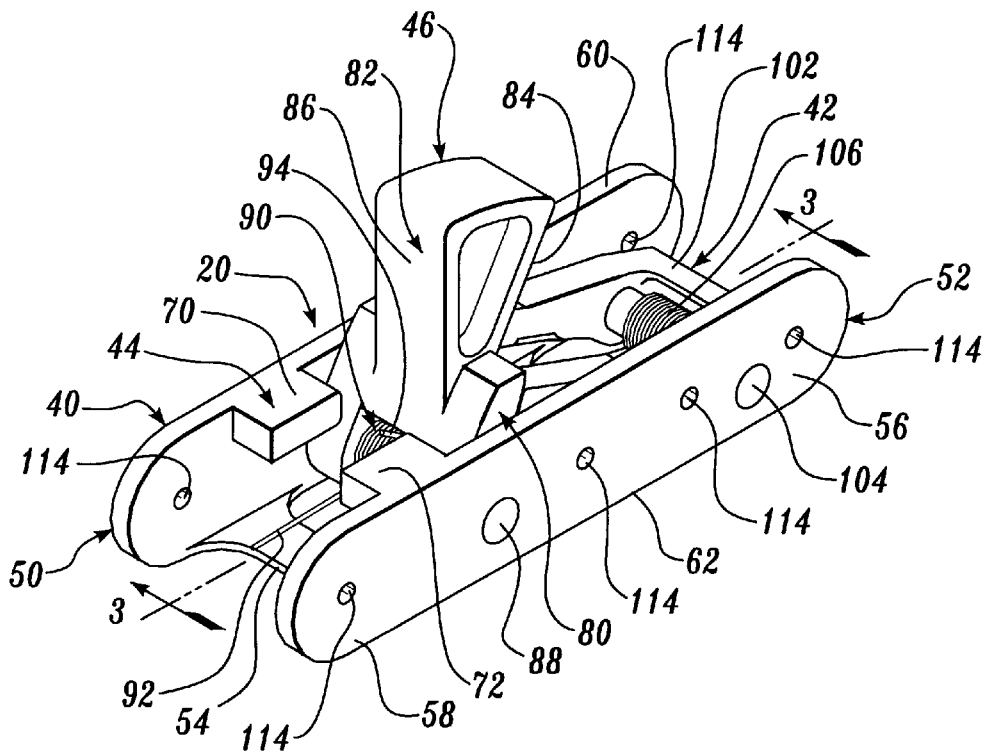
FIG. 2 is a perspective view of the bi-directional cargo restraint of the present invention shown in the extended position with a stop member locking an abutment member into an upright position as it would be used to restrain a cargo container.

As may be seen better in FIG. 2, the preferred embodiment of the cargo restraint 20 includes a frame 40, a first stop member 42, a second stop member 44, and an abutment member 46. The frame 40 is preferably an elongate and substantially U-shaped member, formed from a high strength material, such as aluminum, titanium or stainless steel. The frame 40 has oblong first and second side plates 50 and 52, a first cross member 54, a first end 56, and a second end 58 longitudinally spaced from the first end 56. The frame 40 also has an upper surface 60 and a lower surface 62. The first and second side plates 50 and 52 are held in spaced parallel disposition at the second end 58 of the frame 40 by the first cross member 54 that is integrally formed from and spanning between the first and second side plates 50 and 52. The first cross member 54 spaces the first and second side plates 50 and 52 such that the frame 40 fits within the cargo track 32 (FIG. 1) of the cargo floor 28. Although it is preferred that the first cross member 54 be integrally formed from the side plates 50 and 52, other manufacturing techniques, such as a separate cross member 54 that is welded between the side plates, are also within the scope of the invention.

Preferably, the first cross member 54 spans between the first and second side plates 50 and 52 near the lower surface 62 of the frame 40 and substantially opposite the second stop member 44. The second stop member 44 has first and second tabs 70 and 72 located near the upper surface 60 of the frame 40. The first and second tabs 70 and 72 project inwardly from opposing sides of the first and second side plates 50 and 52, respectively, towards the center of the frame 40, and the tabs 70 and 72 are flush with the upper surface 60 of the frame 40. The first and second tabs 70 and 72 of the second stop member 44 are positioned on the first and second side plates 50 and 52 for blocking engagement with the abutment member 46 when the abutment member 46 is in the extended position, as described in greater detail below.

Still referring to FIG. 2, the abutment member 46 is manufactured from a high strength material, such as aluminum, titanium or stainless steel, and has a base portion 80 and an integral top portion 82. The base portion 80 is shaped as an inverted U and is sized to be pivotally received between the first and second side plates 50 and 52 of the frame 40. The top portion 82 is substantially triangular in shape and projects away from the spine of the base portion 80, with the apex of the top portion 82 integral with the spine of the base portion 80. The center of the top portion 82, defined by the sides and base thereof, has a predetermined amount of material removed to save weight. The sides of the top portion 82 slope upwardly and outwardly from the base portion 80 at a predetermined angle to define first and second restraining surfaces 84 and 86. The top portion 82 is orientated on the base portion 80 such that the first and second restraining surfaces 84 and 86 face the first and second ends 56 and 58 of the frame 40, respectively.

The abutment member 46 is fastened within the frame 40 for pivotal movement thereof by a first pin 88 extending between the first and second side plates 50 and 52 and through the base portion 80. The abutment member 46 pivots about an axis of rotation defined by the first pin 88 between an extended position for resisting the movement of the cargo containers 22 within the fuselage 24, and a retracted position, where the cargo containers 22 freely traverse the upper surface 60 of the cargo restraint 20. The abutment member 46 is biased towards the retracted position by a first torsion spring 90 that is pinned between the sides of the U-shaped base portion 80 by the first pin 88. The first spring 90 has a first end 92 that is seated on the first cross member 54 and a second end 94 that rests against the base portion 80. In the extended position, the first spring 90 urges the abutment member 46 against the first stop member 42, such that the second restraining surface 86 may restrain cargo containers 22 at a predefined restraint location, as described in greater detail below.

Figure 3:
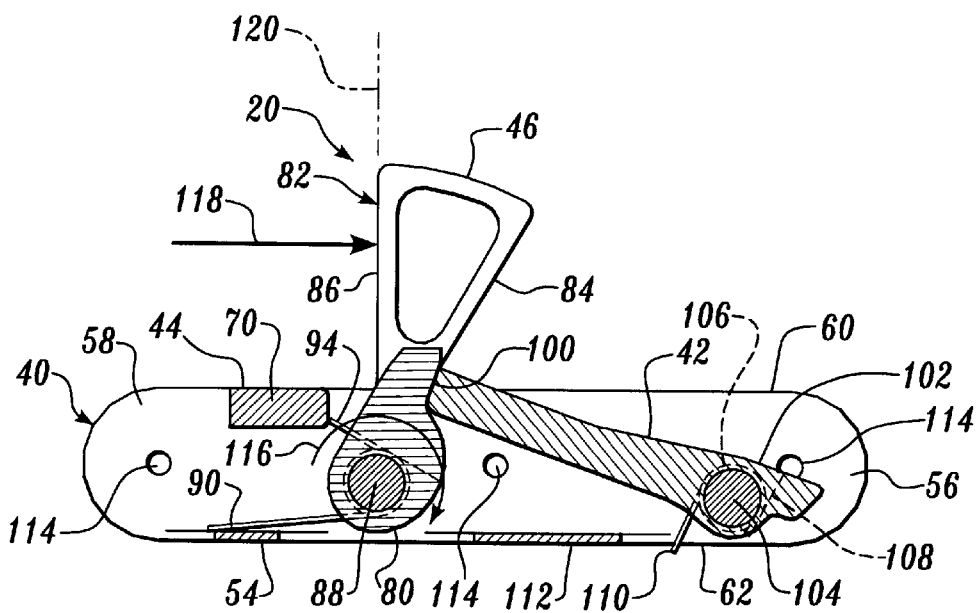
FIG. 3 is a cross sectional view of the bi-directional cargo restraint taken substantially along Section 3—3 of FIG. 2, showing the cargo restraint of the present invention as it would be used as a load stop.

As may be seen better in FIGS. 2 and 3, the first stop member 42 is a rectangularly shaped member with material from its center section removed to allow the abutment member 46 to nest within the first stop member 42 when the abutment member 46 is in the retracted position. The first stop member 42 has a first end 100 and a second end 102. The first stop member 42 is pivotally secured between the first and second side plates 50 and 52 by a second pin 104 extending between the first and second side plates 50 and 52 and through the second end 102. The first stop member 42 also includes a second torsion spring 106 that is coiled around the second pin 104 and has a first end 108 that rests against the second end 102 of the first stop member 42. The second spring 106 also has a second end 110 that is seated on a second cross member 112. The second cross member 112 is formed similarly to the first cross member 54 and is preferably integral with the first and second side plates 50 and 52. The second cross member 112 is located substantially midway between the first and second pins 88 and 104, near the lower surface 62 of the frame 40, and spans between the first and second side plates 50 and 52.

The first end 100 of the first stop member 42 is shaped to engage the abutment member 46 substantially at the intersection of the base and top portions 80 and 82 of the abutment member 46. The first stop member 42 limits movement of the abutment member 46 towards the first end 56 of the frame 40 when the cargo restraint 20 is rigidly secured within the track 32 by a plurality of fasteners (not shown). The fasteners extend through a plurality of attachment holes 114 defined laterally through the first and second side plates 50 and 52 and into corresponding attachment holes (not shown) located in the track 32, thereby fastening the cargo restraint 20 to the cargo floor 28. The cargo restraint 20 is fastened securely within the track 32 such that the upper surface 60 of the frame 40 is either flush with the cargo floor 28 or located just below the cargo floor 28. A plurality of cargo restraints 20 may be located at predetermined and fixed intervals along the length of the cargo floor 28 to accommodate a variety of loading combinations of containers and pallets.

Figure 4:
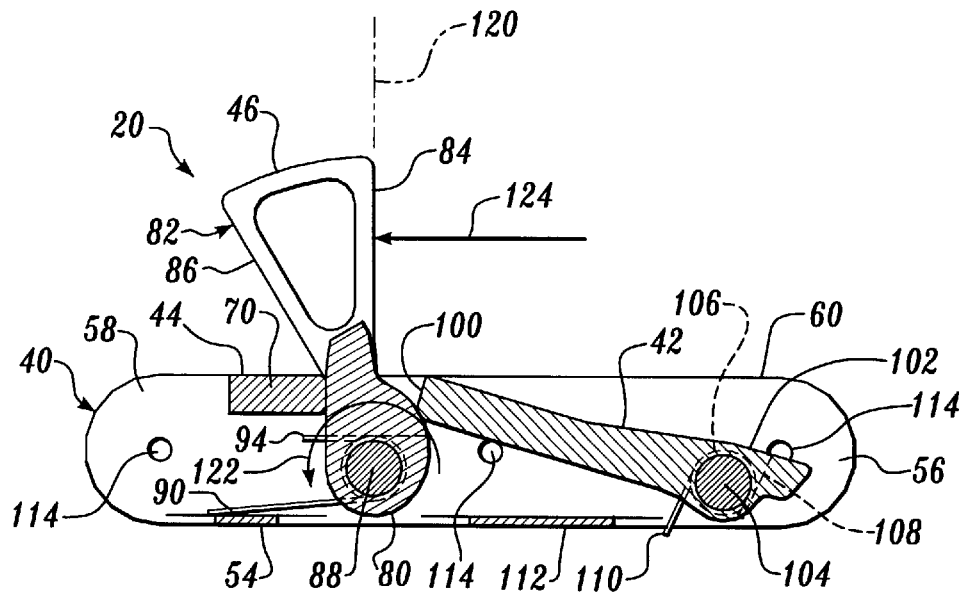
FIG. 4 is a cross sectional view of the bi-directional cargo restraint taken substantially along Section 3—3 of FIG. 2, showing the cargo restraint of the present invention as it would be used as an end stop.

Operation of the cargo restraint 20 may be best understood by referring to FIGS. 3 and 4. The abutment member 46 is located between the first and second stop members 42 and 44 and is permitted to toggle therebetween, such that, depending upon the direction the container 22 is traversing the cargo restraint 20, either the first or second stop members 42 and 44 will restrain and limit the degree of rotation of the abutment member 46. As seen in FIG. 3, the abutment member 46 is in the extended position and its clockwise rotation about the first pin 88, indicated by the arrow 116, is limited by its engagement with the first end 100 of the first stop member 42. As positioned against the first stop member 42, the second restraining surface 86 of the abutment member 46 restrains and limits the movement of cargo containers (not shown) traversing the cargo restraint 20 in the direction indicated by the arrow 118 to a predefined restraint position 120. The restraint position 120 is coplanar with a plane that extends perpendicularly to the upper surface 60 of the frame 40 and is orientated transversely to a longitudinal axis extending between the first and second ends 56 and 58 of the frame 40.

Referring now to FIG. 4, the second stop member 44 limits the counterclockwise rotation of the abutment member 46, indicated by the arrow 122, when a load is applied against the first restraining surface 84. As positioned against the second stop member 44, the first restraining surface 84 restrains and limits the movement of cargo containers (not shown) traversing the cargo restraint 20 in the direction indicated by the arrow 124 to the restraint position 120. By permitting the abutment member 46 to selectively toggle between the first and second stop members 42 and 44, the cargo restraint 20 may be positioned within the fuselage 24, such that, depending upon which direction the containers are traversing the restraint 20, either the first or second restraining surface 84 and 86 will reindex back to the predetermined restraint position. Thus, reindexing the first or second restraining surface 84 or 86 back to the same restraint position limits the movement of the containers within the fuselage to the same location, regardless of whether the containers are traversing from either the first end 56 or second end 58 of the frame 40.

The location of the restraint position 120 within the fuselage 24 is determined during installation of the cargo restraint 20 and is based upon the standard sizes of cargo containers 22. Because the dimensions of the containers and pallets are known, multiple cargo restraints 20 may be located in the cargo floor 28 at predetermined intervals, such that the first and second restraint surfaces 84 and 86 may be toggled to be coplanar with a predetermined restraint position that corresponds to a variety of loading combinations of containers and pallets.

Figure 5:
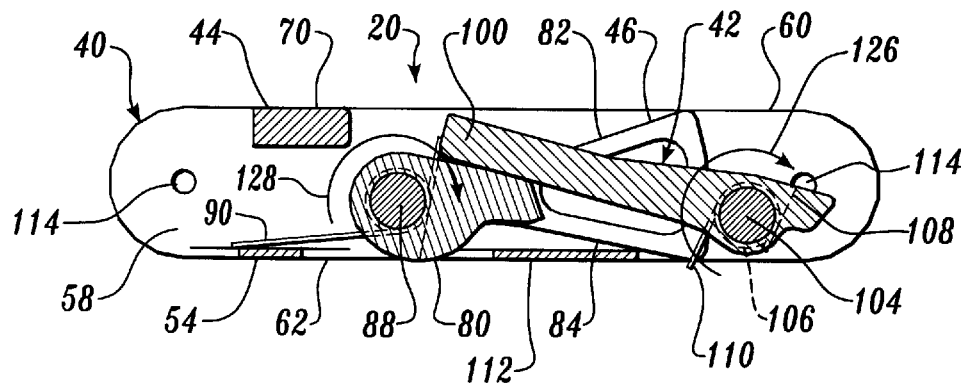
FIG. 5 is a cross sectional view of the bi-directional cargo restraint taken substantially along Section 3—3 of FIG. 2, showing the cargo restraint of the present invention in the retracted position.

As seen in FIG. 5, the cargo restraint 20 is shown in the retracted position. To place the cargo restraint 20 into the retracted position, the second stop member 42 is pivoted in a clockwise direction, as indicated by the arrow 126, about the second pin 104 until the top portion 82 of the abutment member 46 is permitted to pass thereunder. The first spring 90 urges the abutment member 46 in a clockwise direction indicated by the arrow 128 and until it is nested between the first and second side plates 50 and 52 of the frame 40. The second stop member 42 is then released and is urged between the first and second side plates 50 and 52 by the second spring 106, where it is seated on the abutment member 46, such that the top portion 82 of the abutment member 46 is received within the hollowed out center section of the first stop member 42. To place the cargo restraint 20 into the extended position, rotate abutment member 46 counterclockwise until base portion 80 passes under and clears the first stop member 42. In the retracted position, cargo containers freely pass over the upper surface 60 of the cargo restraint 20, thereby permitting movement of the containers thereacross during the loading and unloading of the aircraft.

The previously described embodiment of the present invention provides several advantages over cargo restraints currently available in the art. The cargo restraint of the present invention provides an abutment member that may be toggled within a frame, such that opposite sides of the abutment member can restrain containers at a common, dedicated restraint position to prevent cargo containers from traversing the frame along an axial direction defined between the ends of the frame. Having a dedicated restraint position reduces the number of restraints required in a cargo hold of an aircraft and, therefore, increases the amount of revenue generating payload an aircraft can carry. Rigidly securing the bi-directional cargo restraint of the present invention to the aircraft eliminates the need for airline operators to relocate the restraints and, therefore, not only saves time in loading and unloading the aircraft, but also reduces the risk of lost or stolen restraints. The bi-directional stop allows the pallets and containers to be intermixed in any combination while allowing the containers to be gang loaded. Thus, these and other advantages combine to define a bi-directional cargo restraint that can restrain cargo containers at a common, dedicated restraint position, such that the cargo restraint of the present invention may be used both as an end stop and a load stop without requiring airline operators to relocate restraints or install additional restraints.

From the foregoing description, it may be seen that the bi-directional cargo restraint of the present invention incorporates many novel features and offer significant advantages over those currently available in the art. It will be apparent to those of ordinary skill that the embodiment of the invention illustrated and described herein is exemplary only and changes can be made to the foregoing embodiment while remaining within the spirit and scope of the present invention. Thus, the illustrated and described embodiment is to be considered as exemplary only and various changes can be made without departing from the spirit and scope of the invention.

The embodiments of the invention in which an exclusive property or privilege is claimed are defined as follows:

1. A bi-directional restraint mechanism for restraining a unit load device ("ULD") from movement across an interior surface of an aircraft, said restraint mechanism comprising:

(a) a frame having an upper surface positionable flush or below said surface of said aircraft, first and second ends, and an axis extending between said first and second ends;

(b) first and second stop members mounted in said frame; and (c) an abutment member having a first end and a second end, said second end being movably mounted to said frame for movement of said abutment member between an extended position and a retracted position, said abutment member in said extended position capable of being toggled against either said first or second stop member, said first end of said abutment member selectively restraining said ULD at a common predetermined restraint position regardless of whether said abutment member is toggled against said first or second stop member.

2. The bi-directional restraint mechanism of claim 1, wherein said restraint position is defined by a plane extending perpendicularly to said upper surface of said frame and orientated transversely to said axis, said first end of said abutment member having first and second restraining surfaces on opposite sides thereof, said abutment member in said extended position capable of being toggled between said first and second stop members to selectively permit either said first or second restraint surface of said abutment member to restrain said ULD at said restraint position.

3. The bi-directional restraint mechanism of claim 2, wherein said first stop member further has a first end pivotally mounted in said frame at a predetermined distance from said first end thereof and a second end longitudinally spaced therefrom.

4. The bi-directional restraint mechanism of claim 3, wherein said first stop member is pivotal between (i) a stop position for blocking engagement with said abutment member when said abutment member is in said extended position to restrain said ULD against said second restraining surface at said restraint position and (ii) a nested position wherein said container freely traverses said restraint mechanism.

5. The bi-directional restraint mechanism of claim 4, wherein said second stop member is rigidly secured to said frame at a predetermined distance from said second end thereof and positioned for blocking engagement with said abutment member when said abutment member is in said extended position to restrain said ULD against said first restraining surface at said restraint position.

6. In an airplane having a fuselage and a floor extending within said fuselage, a bi-directional restraint mechanism for restraining freight containers within said fuselage, said restraint mechanism comprising:

(a) a frame having an upper surface, a lower surface, first and second ends, and an axis extending between said first and second ends, said upper surface of said frame being flushly mounted within said floor of said airplane to permit said freight containers to pass over said frame;

(b) first and second stop members mounted in said frame; and (c) an abutment member having a first end defining first and second restraining surfaces on opposite sides thereof and a second end, said second end being movably mounted to said frame for selective movement of said abutment member between an extended position to restrain said freight containers from movement in an axial direction and a nested position, said abutment member in said extended position capable of being toggled between said first and second stops to selectively permit either said first or second restraining surface of said abutment member to restrain said freight containers at a common predetermined restraint position regardless of whether said abutment member is toggled against said first or second stop member, wherein said restraint position is defined by a plane extending perpendicularly to said axis of said frame to said upper surface thereof.

7. The bi-directional restraint mechanism of claim 6, wherein said first stop member further comprises a first end pivotally mounted in said frame and a second end longitudinally spaced therefrom.

8. The bi-directional restraint mechanism of claim 7, wherein said first stop member is pivotal between (i) a stop position for blocking engagement with said abutment member when said abutment member is in said extended position to restrain said freight containers against said second restraining surface at said restraint position, and (ii) a nested position beside said abutment member in said nested position, wherein said freight containers freely traverse said restraint mechanism.

9. The bi-directional restraint mechanism of claim 8, wherein said second stop member is rigidly secured to said frame at a predetermined distance from said second end thereof and positioned for blocking engagement with said abutment member when said abutment member is in said extended position to restrain said freight containers against said first restraining surface at said restraint position.

10. A bi-directional restraint mechanism for restraining a unit load device ("ULD") for movement across an interior surface of an aircraft, said restraint mechanism comprising:

(a) a base having an upper surface postionable flush or below said surface of said aircraft, first and second ends, and an axis extending between said first and second ends; and (b) restraining means for selectively restraining said ULD at a predetermined restraint position, said restraining means having a first end defining first and second restraining surfaces on opposite sides thereof and a second end, said second end being movably mounted to said base for selective movement of said restraining means between an extended position to restrain said ULDs from movement in an axial direction and a retracted position, said restraining means in said extended position capable of being toggled to selectively permit either said first or second restraining surface of said restraining means to restrain said ULDs at a common predetermined restraint position regardless of which direction said restraining means is toggled, wherein said restraining position is defined by a plane extending perpendicularly to said axis of said base to said upper surface thereof.

11. A bi-directional restraint mechanism for restraining a unit load device ("ULD") from movement across an interior surface of an aircraft, said restraint mechanism comprising:

(a) a frame having an upper surface positionable flush or below said surface of said aircraft, first and second ends, and an axis extending between said first and second ends;

(b) first and second stop members mounted in said frame; and (c) an abutment member having a first end and a second end, said second end being movably mounted to said frame for movement of said abutment member between an extended position and a retracted position, said abutment member in said extended position capable of being toggled against either said first or second stop member, said first end of said abutment member selectively restraining said ULD at a predetermined restraint position to prevent said ULD from traversing said frame in the axial direction toward said first or second end of said frame depending on whether said abutment member is toggled respectively against said first or second stop member, wherein said restraint position is defined by a plane extending perpendicularly to said upper surface of said frame and orientated transversely to said axis, said first end of said abutment member having first and second restraining surfaces on opposite sides thereof, said abutment member in said extended position capable of being toggled between said first and second stop members to selectively permit either said first or second restraint surface of said abutment member to restrain said ULD at said restraint position, wherein said first stop member further has a first end pivotally mounted in said frame at a predetermined distance from said first end thereof and a second end longitudinally spaced therefrom, wherein said first stop member is pivotal between (i) a stop position for blocking engagement with said abutment member when said abutment member is in said extended position to restrain said ULD against said second restraining surface at said restraint position and (ii) a nested position wherein said container freely traverses said restraint mechanism, wherein said second stop member is rigidly secured to said frame at a predetermined distance from said second end thereof and positioned for blocking engagement with said abutment member when said abutment member is in said extended position to restrain said ULD against said first restraining surface at said restraint position.

12. In an airplane having a fuselage and a floor extending within said fuselage, a bi-directional restraint mechanism for restraining freight containers within said fuselage, said restraint mechanism comprising:

(a) a frame having an upper surface, a lower surface, first and second ends, and an axis extending between said first and second ends, said upper surface of said frame being flushly mounted within said floor of said airplane to permit said freight containers to pass over said frame;

(b) first and second stop members mounted in said frame; and (c) an abutment member having a first end defining first and second restraining surfaces on opposite sides thereof and a second end, said second end being movably mounted to said frame for selective movement of said abutment member between an extended position to restrain said freight containers from movement in an axial direction and a nested position, said abutment member in said extended position capable of being toggled between said first and second stops to selectively permit either said first or second restraining surface of said abutment member to restrain said freight containers at a predetermined restraint position defined by a plane extending perpendicularly to said axis of said frame to said upper surface thereof, wherein said first stop member further comprises a first end pivotally mounted in said frame and a second end longitudinally spaced therefrom, wherein said first stop member is pivotal between (i) a stop position for blocking engagement with said abutment member when said abutment member is in said extended position to restrain said freight containers against said second restraining surface at said restraint position, and (ii) a nested position beside said abutment member in said nested position, wherein said freight containers freely traverse said restraint mechanism, wherein said second stop member is rigidly secured to said frame at a predetermined distance from said second end thereof and positioned for blocking engagement with said abutment member when said abutment member is in said extended position to restrain said freight containers against said first restraining surface at said restraint position.

\* \* \* \* \*